(12) United States Patent
Pandey et al.

(10) Patent No.: US 11,399,279 B2
(45) Date of Patent: Jul. 26, 2022

(54) SECURITY CREDENTIALS RECOVERY IN BLUETOOTH MESH NETWORK

(71) Applicant: STMicroelectronics International N.V., Geneva (CH)

(72) Inventors: Prashant Pandey, Kanpur (IN); Salil Jain, Delhi (IN); Alok Kumar Mittal, Noida (IN)

(73) Assignee: STMicroelectronics International N.V., Geneva (CH)

( * ) Notice: Subject to any disclaimer, the term of this patent is extended or adjusted under 35 U.S.C. 154(b) by 351 days.

(21) Appl. No.: 16/531,587

(22) Filed: Aug. 5, 2019

(65) Prior Publication Data
US 2021/0044971 A1  Feb. 11, 2021

(51) Int. Cl.
*H04W 12/041* (2021.01)
*H04L 9/32* (2006.01)
*H04W 12/037* (2021.01)
*H04L 9/08* (2006.01)

(52) U.S. Cl.
CPC ......... *H04W 12/041* (2021.01); *H04L 9/3226* (2013.01); *H04W 12/037* (2021.01); *H04L 9/0894* (2013.01)

(58) Field of Classification Search
CPC .............. H04W 12/041; H04W 12/037; H04L 9/3226; H04L 9/0894
USPC ....................................................... 713/171
See application file for complete search history.

(56) References Cited

U.S. PATENT DOCUMENTS

| | | | |
|---|---|---|---|
| 7,661,128 B2 | 2/2010 | Chen et al. | |
| 7,990,895 B2 | 8/2011 | Ferguson et al. | |
| 8,103,333 B2 | 1/2012 | Tran | |
| 8,358,197 B2 | 1/2013 | Tran | |
| 9,277,477 B2 | 3/2016 | Leppanen et al. | |
| 9,774,580 B2 | 9/2017 | Lin | |
| 10,111,071 B2 * | 10/2018 | Polo | H04W 88/04 |
| 10,262,210 B2 * | 4/2019 | Kirkby | G06F 3/0488 |

(Continued)

OTHER PUBLICATIONS

Hardware Security Threats Against Bluetooth Mesh Networks Alexandare Adomnicai, Jacques J.A. Fournier, Laurent Masson—IEEE International Workshop on Attacks and Defenses for Internet-of-Things (ADIoT). pages 1-9, 2018 (Year: 2018).*

(Continued)

*Primary Examiner* — Khalil Naghdali
(74) *Attorney, Agent, or Firm* — Slater Matsil, LLP

(57) ABSTRACT

In accordance with embodiments, methods for the recovery of security credentials of a Bluetooth mesh network are disclosed. A computing device of the Bluetooth mesh network receives user login information, and generates a network key of the Bluetooth mesh network based on the user login information. The computing device generates an application key of a first node to be provisioned based on user login information. A device key is generated using the unicast address of the first node and part of user credentials. The current sequence number is recovered by one of the four techniques depending on the characteristics of the network. The unicast addresses of the nodes are assumed to be sequential and later validated by sending messages. IV index is recovered using processes defined in the Bluetooth mesh standard. After recovery of the above parameters, the mesh network can operate normally using the aforementioned computing device.

26 Claims, 6 Drawing Sheets

(56) References Cited

U.S. PATENT DOCUMENTS

| | | | |
|---|---|---|---|
| 2010/0275250 A1 | 10/2010 | Devadoss et al. | |
| 2014/0189808 A1* | 7/2014 | Mahaffey | H04L 63/083 |
| | | | 726/4 |
| 2019/0068566 A1* | 2/2019 | Gandhi | H04L 63/102 |
| 2019/0073895 A1* | 3/2019 | Pang | G08B 25/009 |
| 2019/0182666 A1* | 6/2019 | Kotay | H04W 12/50 |
| 2020/0169572 A1* | 5/2020 | Jana | H04L 63/1416 |
| 2021/0037387 A1* | 2/2021 | Kharvar | H04L 9/3226 |

OTHER PUBLICATIONS

Cruz et al. 2016 IEEE Global Humanitarian Technology Conference (GHTC), "Design and Implementation of a Low-cost and Reliable Wireless Mesh Network for First-Response Communications" (Year: 2016).*

Adomnicai et al., 2018 IEEE CNS International Workshop on Attacks and Defenses for Internet-of-Things (ADIoT), "Hardware Security Threats Against Bluetooth Mesh Networks", pp. 1-9 (Year: 2018).*

Baert, M., et al., "The Bluetooth Mesh Standard: An Overview and Experimental Evaluation", Sensors, MDPI, Jul. 25, 2018, 24 Pages.

Woolley, M., "Bluetooth Mesh Networking/ An Introduction for Developers", Bluetooth, 2017, 28 Pages.

Ramlee, R.A., et al., "Bluetooth Remote Home Automation System Using Android Application", The International Journal of Engineering and Science (IJES), vol. 2, Issue 01, Jan. 11, 2013, 5 Pages.

* cited by examiner

SECURITY CREDENTIALS RECOVERY IN BLUETOOTH MESH NETWORK

TECHNICAL FIELD

The present invention relates generally to systems and methods for designing Bluetooth mesh network, and, in particular embodiments, to recovering security credentials in a Bluetooth mesh network.

BACKGROUND

Bluetooth® is a wireless technology standard supporting exchanging data between fixed or mobile devices over short distances (typically within tens of meters of one another) using short-wavelength ultra-high frequency (UHF) radio waves. Bluetooth mesh networking is a protocol based on Bluetooth Low Energy that allows many-to-many communications over the Bluetooth radio.

Bluetooth mesh networking extends the capabilities of the Bluetooth technology from one-to-one communications (i.e., pairing), or one-to-many communications (i.e., broadcasting), to many-to-many communications in a large device network. Bluetooth mesh networking can be applied to a wide variety of applications, such as smart lighting, building automation, wireless sensor networks, asset tracking, smart home, and street lighting.

A Bluetooth mesh network is protected by multiple security credentials. These security credentials are generated by and stored on a provisioning device (usually a smart phone). If any or all of these security credentials become inaccessible—for example, due to the loss or damage of the provisioning device—the Bluetooth mesh network cannot operate.

In conventional systems, the solution for recovering the security credentials is to save the security credentials for a Bluetooth mesh network in a cloud based storage service for later recovery. However, there are technical drawbacks to the recovery approach in the conventional systems. The conventional recovery approach requires Internet connectivity to the cloud service. Using the cloud service consumes additional network resources for Internet connectivity. Moreover, the conventional recovery approach can be unreliable and works ineffectively in remote or developing areas where cloud services are not accessible due to poor or no Internet connectivity. Furthermore, the conventional cloud based recovery approach requires more setup steps (e.g. creating an account for the cloud service), which consume even more network resources. In addition, there are security and privacy concerns associated with the conventional cloud based recovery approach, which usually involves sharing personal information such as the email address and/or the phone number of the user. Accordingly, technical solutions to technical problems of the conventional recovery approach are desired to enhance reliability, improve network resource utilization, and lower the security risks for recovering security credentials of a Bluetooth mesh network.

SUMMARY

In accordance with embodiments, methods for security credentials of a Bluetooth mesh network are disclosed. A computing device (i.e., the provisioning device or the provisioner) of the Bluetooth mesh network receives user login information. The computing device generates a network key of the Bluetooth mesh network based on the user login information. The computing device generates an application key of a first node to be provisioned based on the user login information.

In one embodiment, the user login information is a user pin. In another embodiment, the user login information is a combination of a username and a password.

In some embodiments, the computing device transmits, to a first node in the Bluetooth mesh network, a message comprising a provisioning command over the Bluetooth mesh network. The message may be encrypted based on the network key and the application key.

In some embodiments, the computing device may receive (from the user input, for example) the number of nodes in the Bluetooth mesh network. The computing device may then generate unicast addresses corresponding to the nodes sequentially based on the number of nodes provided by the user.

In some embodiments, the computing device may generate a device key for each unprovisioned node based on a unicast address and user pin/password corresponding to the first node. The message may be encrypted based on the network key, the application key, and the device key.

In some embodiment, the computing device may receive a secure network beacon message from the first node. The computing device may recover the IV index in the beacon message and used to send messages in the network.

The message may further comprise a sequence number. In one embodiment, the computing device may transmit messages with incrementing sequence numbers for each of the messages. The computing device then determines the correct sequence number based on an acknowledge message received from the first node. In another embodiment, the computing device may force the sequence number to be 0 by initiating an IV index update for the network. In another embodiment, the computing device may determine the sequence number in the message based on an average number of messages per day transmitted by the provisioning device. In yet another embodiments, the computing device may determine the sequence number in the message to be 0 after assigning a random number as a new address of the computing device. The random number is different from a previous address of the computing device.

Computing devices, as well as computer program products, for performing the methods are also provided.

The foregoing has outlined rather broadly the features of an embodiment of the present disclosure in order that the detailed description of the disclosure that follows may be better understood. Additional features and advantages of embodiments of the disclosure will be described hereinafter, which form the subject of the claims of the disclosure. It should be appreciated by those skilled in the art that the conception and specific embodiments disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

To communicate with a node in a Bluetooth mesh network, multiple security credentials are required. The first credential of these security credentials is a network key, which is common to all nodes in the Bluetooth mesh network. The second credential is an application key that is common to a specific application (e.g., smart lighting) in the Bluetooth mesh network. The third credential is a device key. The device key is unique to each node in the Bluetooth mesh network. The fourth and fifth credentials are the IV index and the sequence number (SEQ). The IV Index and the SEQ together form a "nonce" used to prevent replay attacks. A nonce is an arbitrary number which is unique for each message transmitted by a particular node in the Bluetooth mesh network. The last credential required by the Bluetooth mesh network is the unicast address of the node.

Figure 1:
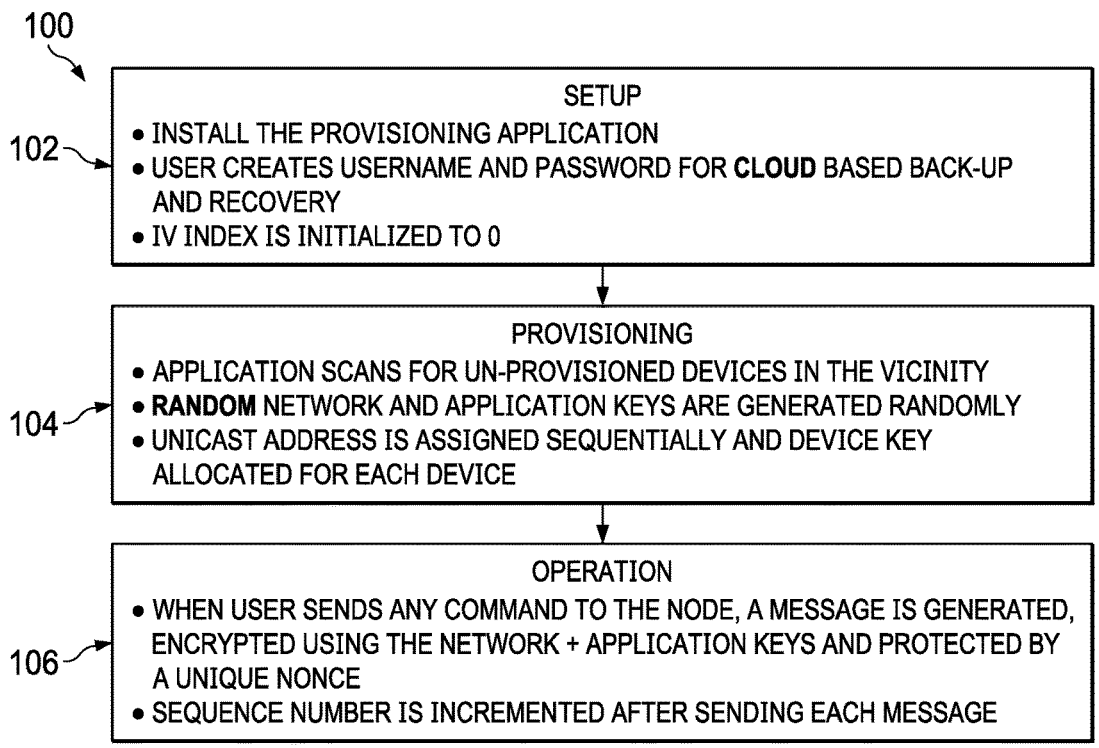
FIG. 1 illustrates a high level flow chart of the conventional techniques for operating a Bluetooth mesh network.

FIG. 1 shows a high level flow chart 100 of the conventional technique for operating a Bluetooth mesh network. During the setup stage 102, the provisioning application for a Bluetooth mesh network is installed on a provisioning device, such as a mobile phone. The user also creates the username and the password for a cloud based service for later backup and recovery operations. The IV index is initialized to 0 at the setup stage 102.

During the provisioning stage 104, the installed provisioning application scans for un-provisioned Bluetooth devices in its vicinity. In conventional systems, the provisioning application generates the network key and the device key randomly at the provisioning stage and application key during configuration 104. Also, the provisioning application assigns the unicast address sequentially and allocates the device key for each un-provisioned device.

During the operation stage 106, when the user uses the provisioning application on the provisioning device to send any command to a Bluetooth mesh node, a message is generated. The message is encrypted using the network key and the application key. The encrypted message is also protected by a unique nonce (e.g., the nonce formed from the IV index and the SEQ described above). The SEQ is incremented after each message is sent.

If the security credentials of a Bluetooth mesh network are lost, the Bluetooth mesh network cannot operate correctly. As explained above, there are technical problems of conventional systems for recovering the security credentials using a cloud based approach, including unreliability, inefficient use of network resources for Internet connectivity, and security risks. To solve these technical problems of the conventional systems, embodiment techniques of this disclosure provide technical solutions. In contrast to conventional systems' random generation approach, embodiment techniques of this disclosure generate some of the security credentials (e.g., the network key, the application key, and the device key) based on user login information. The user login information can be a user pin or a combination of the username and password (also called the netname and the net password) for logging into the provisioning application. By generating the mesh security credentials based on the user login information, rather than the random generation in conventional systems, the remaining credentials of the Bluetooth mesh network can be recovered using the Bluetooth mesh network itself, without requiring Internet connectivity to a cloud service. In so doing, embodiment techniques of this disclosure provide technical improvement that enhances reliability, improves network resource utilization, and lowers the security risks over the conventional systems.

Figure 2:
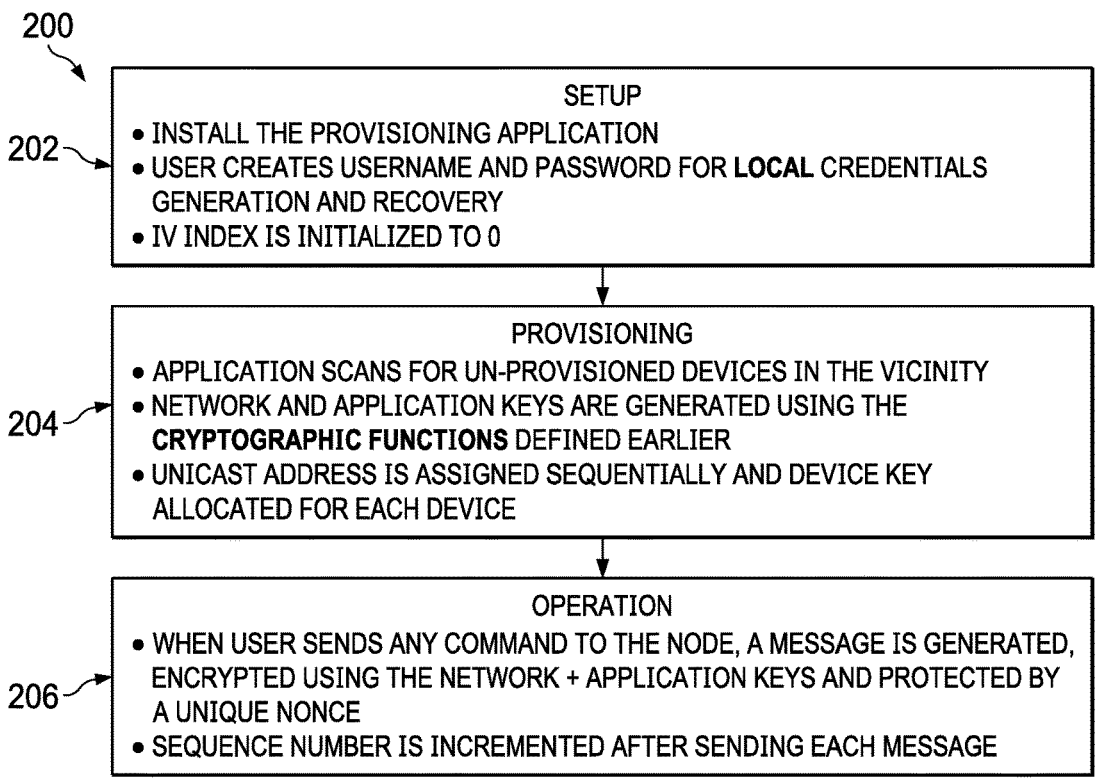
FIG. 2 illustrates a high level flow chart of the embodiment techniques for operating a Bluetooth mesh network.

FIG. 2 shows a high level flow chart 200 of the embodiment technique for operating the Bluetooth mesh network. During the setup stage 202, the provisioning application for a Bluetooth mesh network is installed on a provisioning device, such as a mobile phone. Different from the conventional approach, at this stage, the user creates the local username and password (or a local pin) for generating local security credentials and for later recovery of the local security credentials. The IV index is initialized to 0 at the setup stage 202.

During the provisioning stage 204, the installed provisioning application scans for un-provisioned Bluetooth devices in its vicinity. Different from the conventional approach, the provisioning application here generates the network key and the application key using cryptographic functions based on the local username and password (or the local pin) at the provisioning stage 204 (for example, as described with respect to FIG. 3). Also, the provisioning application assigns the unicast address sequentially and allocates the device key for each un-provisioned device.

During the operation stage 206, when the user sends any command to a Bluetooth node in the Bluetooth mesh network, a message is generated. The message is encrypted using the network key and the application key. The encrypted message is also protected by a unique nonce (e.g., the nonce formed from the IV index and the SEQ described above). The SEQ is incremented after each message is sent.

With the embodiment techniques, a user creates a local username and password (or a user pin) for the provisioning application on the provisioning device (e.g., a smart phone application) at the time of setup. Once the security credentials are generated based on the local username and password (or the local pin), the provisioning application on the provisioning device can provision the unprovisioned mesh devices into Bluetooth mesh network (e.g., sending provisioning commands as described with respect to the operation 206).

Later on, if the user needs to access the Bluetooth mesh network on a second device (e.g., another smart phone), or if the user needs to recover the security credentials in case the content on the original provisioning device is lost, the user can use the second device with the provisioning application installed. The user can re-enter the same local username and password (or the same local pin) created during the setup stage 202 using the provisioning application on the second device. Some of the security credentials can be generated based on the local username and password (or the local pin). Other credentials can be recovered from the Bluetooth mesh network, without having to access the Internet. The embodiment technical solutions are secure because the solutions use a combination of the Bluetooth network information along with the local username and the password (at least the password being secret) provided by the user.

Figure 3:
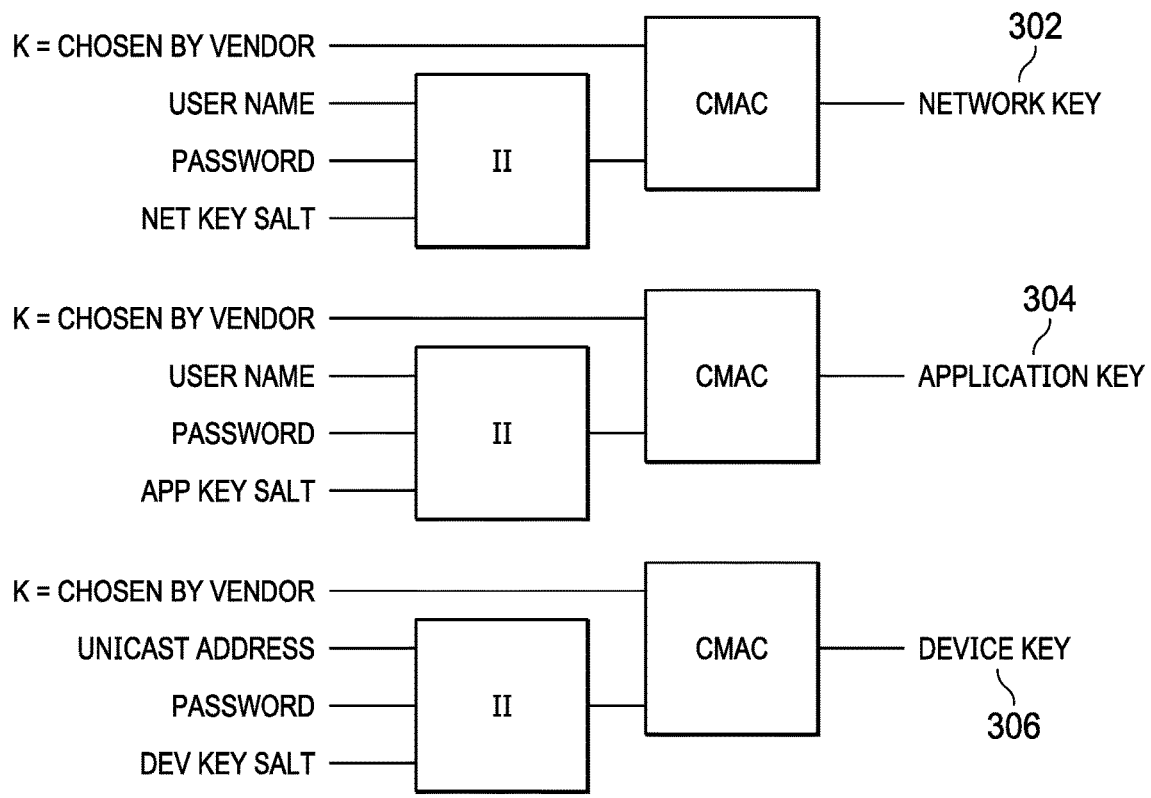
FIG. 3 illustrates a block diagram for calculating the network key, the application key, and the device key, according to some embodiments.

As described above, for Bluetooth mesh network communications, the network key, the application key, the device key, the IV index, the SEQ number, and the unicast address are required. According to embodiment techniques, the network key, the application key, and device key by applying cryptographic function to local password & unicast address are created by applying cryptographic functions to the local username and password. FIG. 3 shows a block diagram for calculating the network key, the application key, and the device key, according to some embodiments.

For example, to create a network key 302, a salt for the network key may be created based on the following function.

NetKeySalt=$S1$("nksl")

Here, S1 is a salt generation function defined for Bluetooth mesh known in the art. S1 may use the Advanced Encryption Standard Cipher-based Message Authentication Code (AES-CMAC) function. Then, the network key 302 may be generated based on the following function.

NetKey=CMAC($K$,UserName||Password||NetkeySalt)

Here, K is a vendor specific key chosen by the vendor and hardcoded in the provisioning application. CMAC stands for Cipher-based Message Authentication Code, which is known in the art. CMAC is a message authentication code algorithm for calculating message authentication codes using a block cipher coupled with a secret key. CMAC can be used to verify both the integrity and authenticity of a message.

To create an application key 304, a salt for the application key may be created based on the following function.

AppKeySalt=$S1$("aksl")

Then, the application key 304 may be generated based on the following function.

AppKey=CMAC($K$,UserName||Password||AppKey-Salt)

To create a device key 306, a salt for the device key may be created based on the following function.

DevKeySalt=$S1$("dksl")

Then, the device key 306 may be generated based on the following function.

DevKey=CMAC($K$,UnicastAddr||DevKeySalt||Password)

To recover the above security keys, the user may use a second device (or use the original device) and enter the same username and password. The provisioning application can re-generate the network key 302 and the application key 304, using the same cryptographic functions (e.g., S1 and CMAC) with the same salt values and the K value.

In some embodiments, the cryptographic functions described in the embodiment technique may use the same underlying encryption primitives as in official Bluetooth Mesh Profile specifications (e.g., CMAC, Counter with CBC-MAC (CCM), etc.) so that same encryption libraries can be reused.

In conventional systems, the security keys are generated randomly. In contrast, the embodiment techniques generate these security keys using cryptographically secure functions applied to the username and the password (or the user pin). In addition, the vendor specific key K (hardcoded in the provisioning application) is also used. Optionally, the vendor specific key K can be stored on a secure element (e.g., a secure memory) on a provisioning device to ensure the safety of the vendor specific key K.

With the embodiment techniques, as long as the user login information (e.g., the username and the password) remain confidential, the Bluetooth mesh network is fully secure. In addition, because the network keys are generated by the provisioning device, the embodiment techniques are interoperable with conventional systems.

Figure 4:
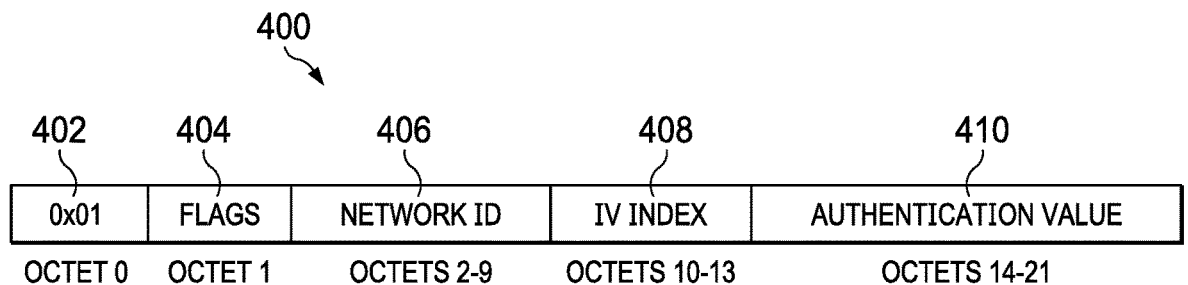
FIG. 4 illustrates the format of secure network beacon packet of a Bluetooth mesh network based on the standard.

The IV index can be recovered using the secure network beacon. In a Bluetooth mesh network, each node periodically sends a secure network beacon packet. FIG. 4 shows the format of secure network beacon packet 400 in the Bluetooth mesh network. The secure network beacon packet 400 includes the first octet 402, the flags 404, the network ID 406, the IV index 408, and the authentication value 410. The network ID 406 and the flags 404 are used to identify the Bluetooth mesh network (out of several networks operating in same area) and its security state. The IV index can be recovered from the field 408 of the beacon packet 400. The authentication value 410 is used to validate the authenticity of the beacon using the network key. The recovery of the network key is described above.

Figure 5:
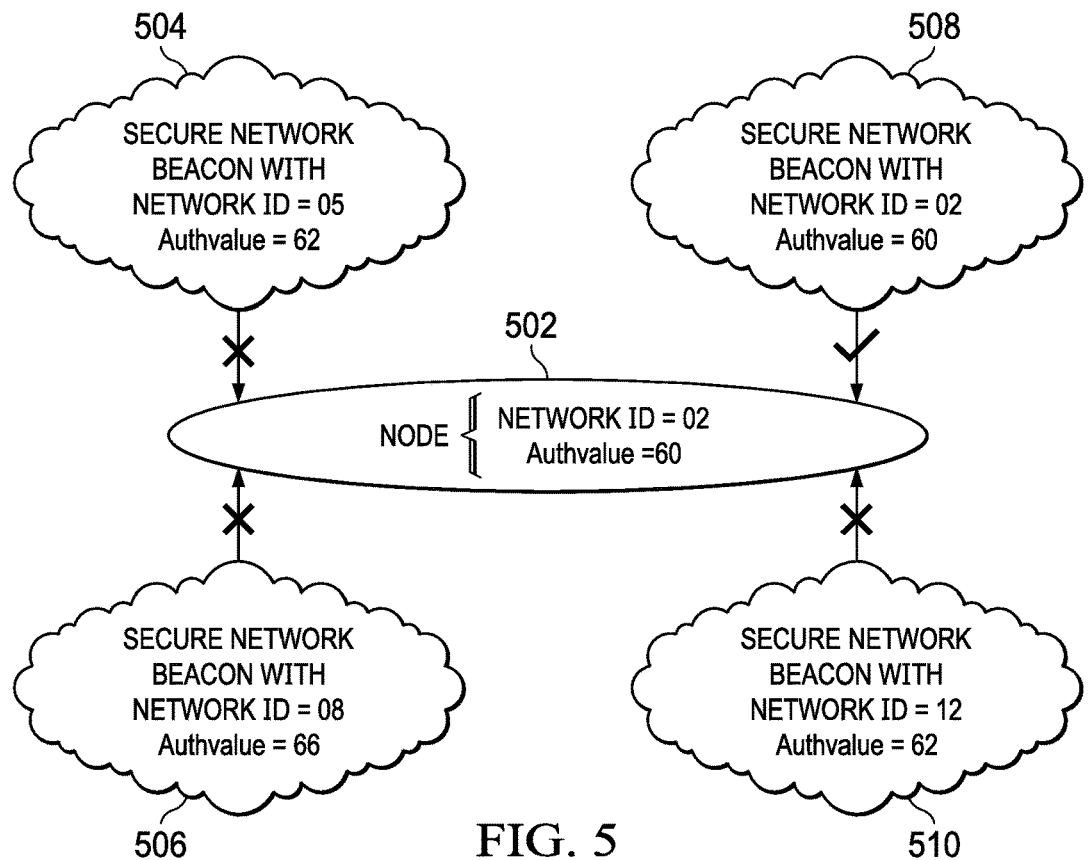
FIG. 5 illustrates a scheme for validating the secure network beacon packet.

FIG. 5 shows an example scheme for validating the secure network beacon packet. The provisioning device (e.g., node 502) receives secure network beacon packets from 4 different Bluetooth mesh networks: the mesh network 504, the mesh network 506, the mesh network 508, and the mesh network 510. As shown in the example in FIG. 5, only the beacon packet from the mesh network 508 has the matching network ID (02) and the matching authentication value (60) for the node 502. So, the secure network beacon packet from the mesh network 508 is validated by the provisioning device 502, and the provisioning application on the provisioning device 502 can recover the IV index from the beacon packet from the mesh network 5o8.

In a Bluetooth mesh network, sequence numbers (SEQs) are used to prevent replay attacks. If an attacker captures a message (using a packet sniffer etc.), and sends (i.e., replays) the same message again to repeat the action, the node should discard such replay message. For example, a car owner unlocks his/her car using the car owner's key fob, and a car thief may capture the signal from the key fob. However, the car thief replaying the same captured signal later should not unlock the car owner's car. A Bluetooth mesh network is protected from such replay attacks by including a sequence number (SEQ) in each transmitted packet. If a receiving node in the Bluetooth mesh network detects that a sequence number is re-used, the receiving node discards the packet. Because the packets (including the sequence numbers) are encrypted, it is not possible for the attacker to forge the sequence numbers.

To perform SEQ recovery, there are 4 embodiment methods correct SEQ must be used so that packet is not discarded. The first embodiment method ("Method 1") for SEQ recovery is a brutal force method. The provisioning application may try sending messages with incrementing SEQs until the provisioning application receives a response from the receiving node. The provisioning application may start sending a message with SEQ=0, and keep on incrementing the SEQ with each transmission. If the SEQ number in the message is incorrect, the receiving node would not respond the message. The received message is simply discarded by the receiving node. When the SEQ number in the message reaches the current SEQ number of the receiving node, the receiving node would send a response back to the sender (i.e., the provisioning device). To speed up the process, the increments for the SEQ number may be incremented exponentially rather than linearly. An attacker cannot use the first embodiment method because the attacker can only replay an existing message. The attacker cannot create a new message with a new SEQ because the security keys described above are required to encrypt the message (including the SEQ).

The second embodiment method ("Method 2") for SEQ recovery is to use the IV index update procedure. As shown in FIG. 4, the IV index is a 4-octet value. In a Bluetooth mesh network, the IV index is used in combination with the 3-octet SEQ to create a unique nonce value for the encrypted packet. The Bluetooth mesh specifications define an IV index update procedure to increment the IV index when the SEQ is about to roll over. So, the side effect of the IV index update procedure is that the SEQ is reset to 0 when the new IV index starts to take effect. Afterwards, packets can be sent with sequence numbers starting from 0. According to Bluetooth mesh specifications, a node shall not execute more than one IV index update within a period of 192 hours (8 days). So, if the second embodiment method for recovering the SEQ is used, the Bluetooth mesh network cannot be recovered again until 8 days has elapsed.

The third embodiment method ("Method 3") for SEQ recovery is to guess the maximum possible sequence number based on the estimated average number of messages sent per day. The third embodiment method makes an assumption on the maximum number of messages that can be sent every day. The maximum possible sequence number (SEQmax) at any given date can be calculated based on the following equation.

SEQmax=(average number of messages per day)×
(days elapsed since the base date)

During the credential recovery stage, SEQmax is used as the starting sequence after the recovery. For example, assume that in a Bluetooth mesh network, any node is allowed to send the maximum of 100 messages per day. Also, assume the base date is Jan. 1, 2019 (e.g., the date when the SEQ is set to 0). If the credential recovery is performed on Jan. 31, 2019, the starting SEQ to be used after the recovery would be SEQmax=100×30=3000. The third embodiment requires a limit on the maximum of the messages that can be sent by a node in the Bluetooth mesh network in a day.

The fourth embodiment method ("Method 4") for SEQ recovery is to use a random unicast address for the provisioning device. Each Bluetooth mesh node stores the sequence number of the last message received from each source address (i.e., the unicast address of the source device). The fourth embodiment method for SEQ recovery assigns a random address to the provisioning device after the credential recovery procedure. Because the source address of the provisioning device after the credential recovery is different from the one before the credential recovery procedure, the provisioning device can start sending messages with the SEQ starting from 0, without being rejected by the receiving node. One limitation of the fourth embodiment method is that, if the randomly generated address for the provisioning device is the same as the address used earlier, the messages would be discarded by the receiving nodes. So, in some rare cases, the random address generation may need to be performed multiple times to ensure that the new source address is different from a previous source address used by the provisioning device. In addition, any publication address stored on the nodes targeting the provisioning device would also need to be updated.

Selection of the SEQ recovery methods is dependent on the type of the application. For example, for low message volume applications such as a light switch application (a user does not need to switch on or off a light more than 30-40 times a day), the third embodiment method for SEQ recovery can be used. For other types of applications, the second embodiment method for SEQ recovery can be used. If the second embodiment method for SEQ recovery has already been used within the last 8 days, the first embodiment method for SEQ recovery can be used.

Figure 6:
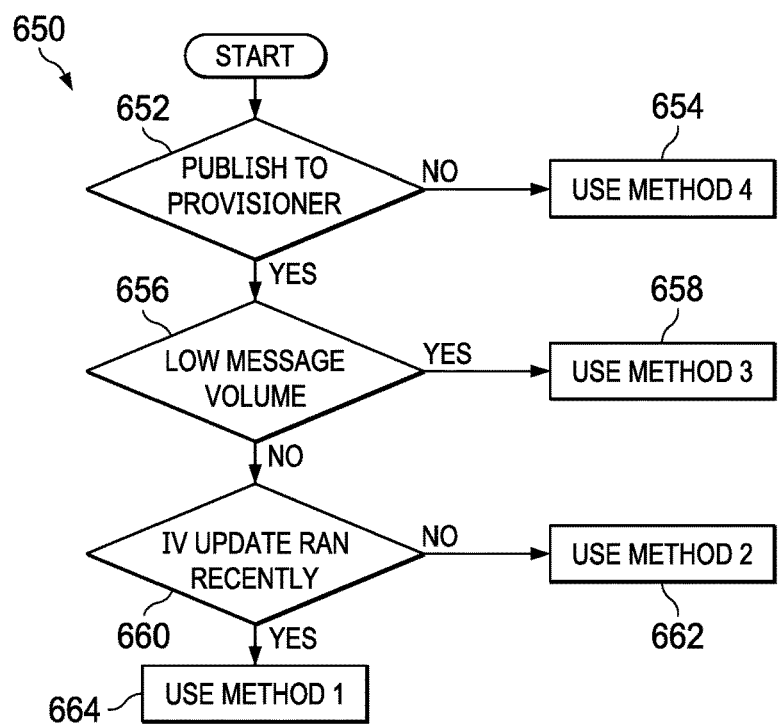
FIG. 6 illustrates a flow chart for selecting a sequence number (SEQ) recovery method, according to some embodiments.

FIG. 6 shows a flow chart 650 for selecting a SEQ recovery method, according to some embodiments. At the operation 652, the provisioning application determines whether the nodes in a Bluetooth mesh network are publishing their address to the provisioner. If not, the provisioning application uses the fourth embodiment method for SEQ recovery at the operation 654. If yes, the flow chart 650 proceeds to the operation 656.

At the operation 656, the provisioning application determines whether it is a low message volume application. If so, the provisioning application uses the third embodiment method for SEQ recovery at the operation 658; otherwise, the flow chart 650 proceeds to the operation 660.

At the operation 660, the provisioning application determines whether an IV index update has been performed recently (e.g., within 8 days). If no, the provisioning application uses the second embodiment method for SEQ recovery at the operation 662. If yes, the provisioning application uses the first embodiment method for SEQ recovery at the operation 664.

As described above, the unicast addresses of the nodes also need to be recovered. The unicast addresses of the nodes in the Bluetooth mesh network are assigned by the provisioning device in a sequential manner. During credentials recovery, the provisioning application may receive the number of nodes installed from the user input. Adding an extra amount (e.g., 15% extra) to the number of nodes can account for the nodes which may have been replaced (unicast addresses of the replaced nodes may not be reused). The provisioning application may create a list of nodes using the sequential unicast addresses. Validity of these assumed addressed can be determined by sending acknowledged messages and checking if a response is received. Once the unicast addresses are determined, Device Keys can be calculated for the nodes, as described above (e.g., DevKey=CMAC(K, UnicastAddr||DevKeySalt||Password)).

The provisioning application may send on/off commands to the nodes to identify them physically and set a friendly name.

Figure 7:
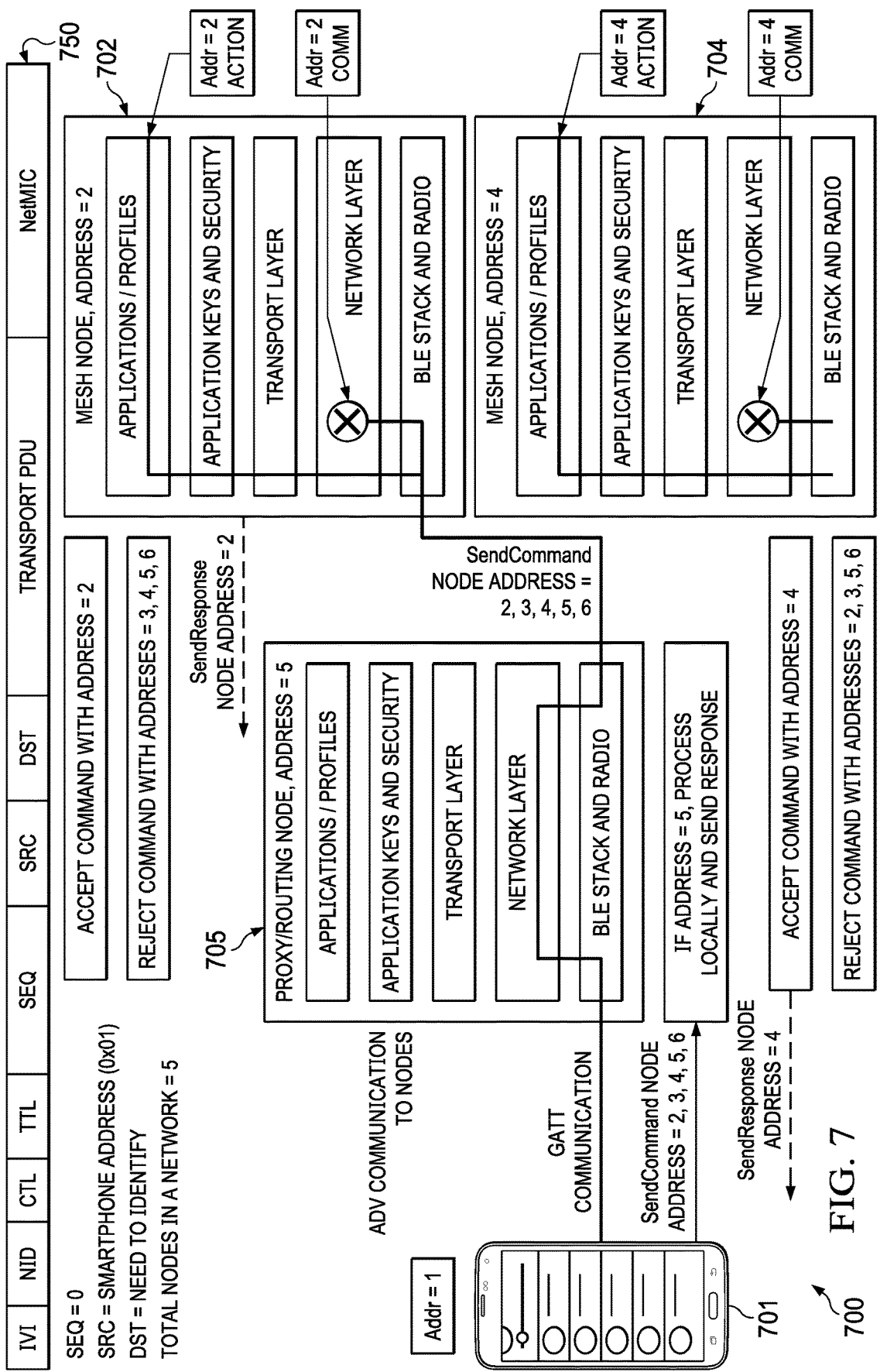
FIG. 7 shows an example of handling unicast addresses in a Bluetooth mesh network.

FIG. 7 illustrates an example of unicast address handling in a Bluetooth mesh network 700. The Bluetooth mesh network 700 comprises a provisioning device 701, a node 702, a node 703 (not shown), a node 704, a node 705, and a node 706 (not shown). The unicast addresses of the provisioning device 701, the node 702, the node 703, the node 704, the node 705, and the node 706 are 1, 2, 3, 4, 5, and 6, respectively. The provisioning device 701 sends messages containing provisioning commands to the node 702, the node 703, the node 704, the node 705, and the node 706. The format of the messages is shown in the format 750, which comprise IVI (IV index), NID (network ID), TTL (time to live), SEQ (sequence number), SRC (source address), DST (destination address), transport PDU (protocol data unit) and NetMIC. Each of the nodes 702, 703, 704, 705, and 706 only accepts and processes the command with its corresponding address, and reject the commands with other addresses. For example, the node 702 only accepts a command with address of 2 and sends a response back to the provisioning device 701. For other commands with other addresses (e.g., 3, 4, 5, 6), the node 702 rejects the commands (i.e., no response sent back to the provisioning device 701).

To further ensure security of the embodiment credential recovery techniques, the user login information (e.g., username/password or a pin) may need to be updated regularly. One method for updating the login information may be performed by running a key refresh procedure as defined in the Bluetooth mesh specifications, as known in the art. The key refresh procedure may take some time to execute. A second method for updating the login information may be re-provisioning all the nodes in the Bluetooth mesh network to change the credentials immediately. The second method is more suitable for small networks.

Figure 8:
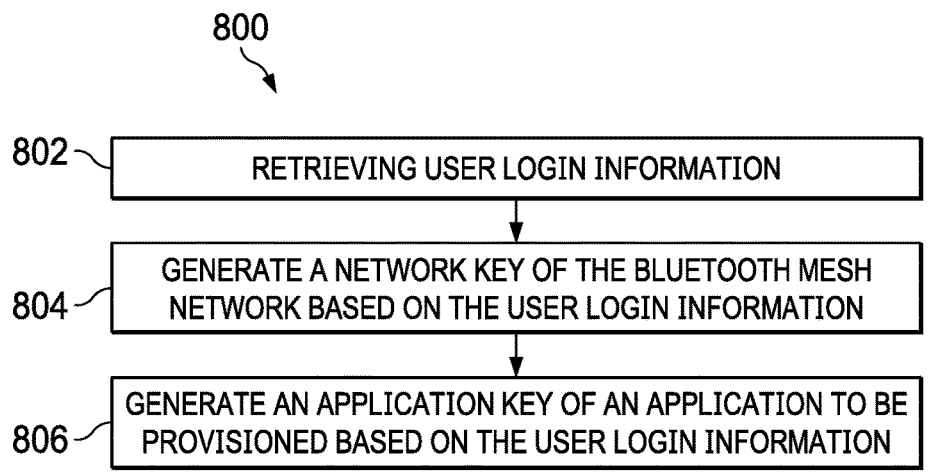
FIG. 8 depicts a flowchart of a method for setting up and/or recovering security credentials in a Bluetooth mesh network, according to some embodiments.

FIG. 8 illustrates a flowchart of a method 800 for recovering secret credentials in a Bluetooth mesh network, according to some embodiments. The method 800 may be carried out or performed by routines, subroutines, or modules of software executed by one or more processors of a computing device, such as the provisioning device either at the initial setup stage or at the security credential recovery stage. Coding of the software for carrying out or performing the method 800 is well within the scope of a person of ordinary skill in the art having regard to the present disclosure. The method 800 may include additional or fewer operations than those shown and described and may be carried out or performed in a different order. Computer-readable code or instructions of the software executable by the one or more processor of the computing device may be stored on a non-transitory computer-readable medium, such as for example, memory of the computing device.

The method 800 starts at the operation 802, where the computing device of the Bluetooth mesh network receives user login information. At the operation 804, the computing device generates a network key of the Bluetooth mesh network based on the user login information. At the operation 806, the computing device generates an application key of a first node (i.e., a mesh node) to be provisioned based on the user login information.

In one embodiment, the user login information is a user pin. In another embodiment, the user login information is a combination of a username and a password.

The computing device transmits, to the first node in the Bluetooth mesh network, a message comprising a provisioning command over the Bluetooth mesh network. The message may be encrypted based on the network key and the application key.

In some embodiments, the computing device may receive (from the user input, for example) the number of nodes in the Bluetooth mesh network. The computing device may then generate unicast addresses corresponding to the nodes sequentially based on the number of nodes.

In some embodiments, the computing device may generate a device key for the first node (i.e., unprovisioned node) of the nodes based on a unicast address corresponding to the first node. The message may be encrypted based on the network key, the application key, and the device key.

The computing device may receive a secure network beacon message from the provisioned node. The computing device may recover the IV index in the secure network beacon message and set the IV index in the message sent to the receiving node.

The message may further comprise a sequence number. The computing device may transmit messages with incrementing sequence numbers for each of the messages. The computing device may determine the sequence in the message based on an acknowledge message received from the first node (i.e., the receiving node). The computing device may determine the sequence number in the message to be 0 after receiving an update message for an IV index from the first node. In another embodiment, the computing device may determine the sequence number in the message based on an average number of messages per day transmitted to the first node. In yet another embodiments, the computing device may determine the sequence number in the message to be 0 after assigning a random number as a new address of the computing device. The random number is different from a previous address of the computing device.

Figure 9:
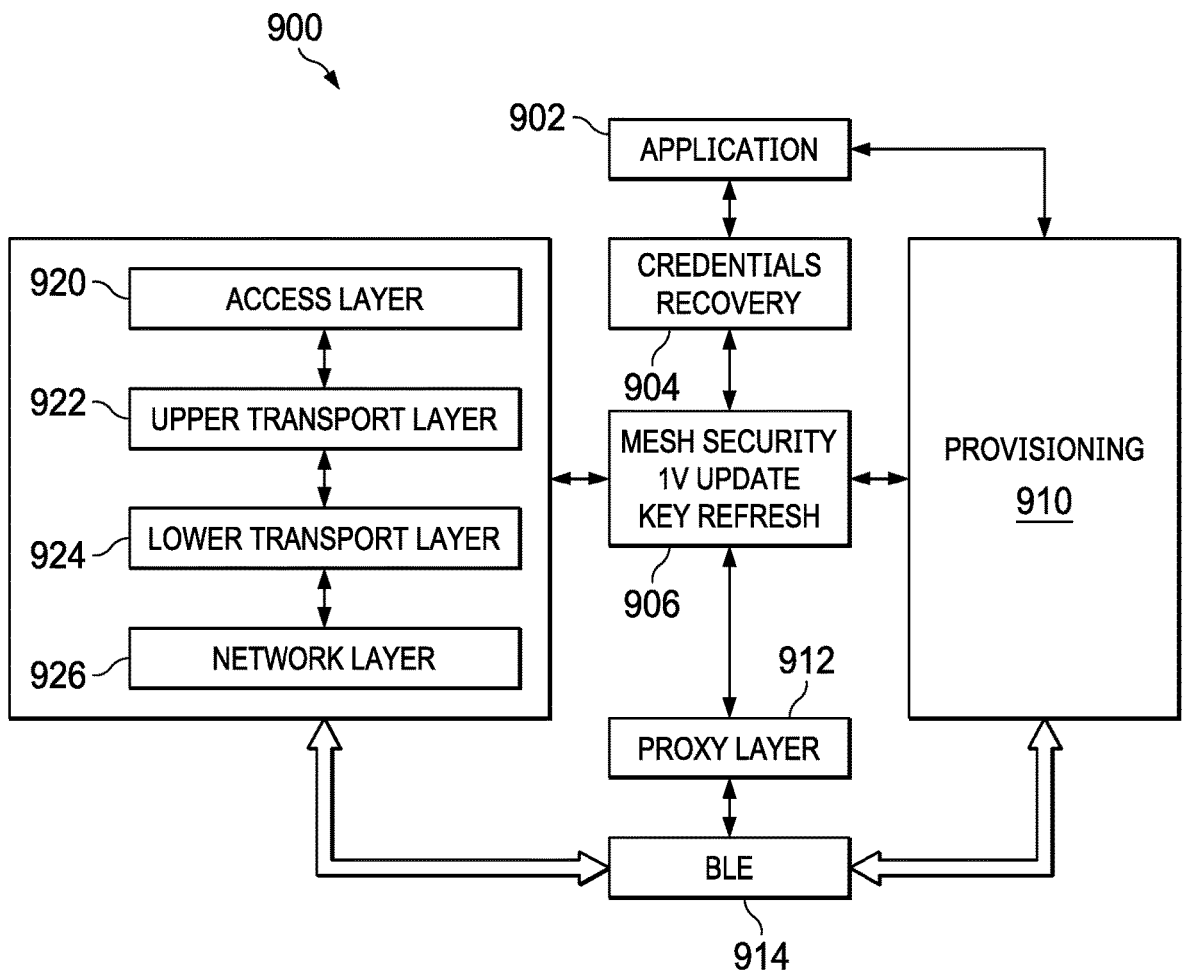
FIG. 9 illustrates a block diagram of a system that can be used for the disclosed techniques, according to some embodiments.

FIG. 9 depicts a block diagram of a system 900 used in the embodiment techniques, according to some embodiments. The system 900 comprises the application layer 902, the credential recovery subsystem 904, the mesh security subsystem 906, the provisioning subsystem 910, the proxy layer 912, the Bluetooth Low Energy (BLE) layer 914, the access layer 920, the upper transport layer 922, the lower transport layer 924, and the network layer 926. The application layer 902 provides a software application for the user to use the system 900. The software application may be a provisioning application described above. The user may enter information, such as the user login information (e.g., a user login pin or a combination of the username and the password), the number of nodes in the Bluetooth mesh network, or configuration information of a node, through the application layer 902. The mesh security subsystem 906 provides security features for the Bluetooth mesh network, such as updating the IV index and refreshing the security keys. The credential recovery subsystem 904 is between the application layer 902 and the mesh security layer 906. The credential recovery subsystem 904 performs security credential recovery tasks as described in this disclosure. For example, the credential recovery subsystem 904 may generate the network key of the Bluetooth mesh network, the application key of a first node (i.e., a mesh node) to be provisioned, the unicast addresses of the nodes, and the device keys using the embodiment techniques described in this disclosure. The credential recovery subsystem 904 may also determine the IV index and the SEQ using the embodiment techniques described in this disclosure. The provisioning subsystem 910 receives user input from the application layer 902 and generates corresponding commands based on the user input (e.g., configuration information of a node). The commands may comprise configurations of a node to be provisioned in the Bluetooth mesh network.

The access layer 920 may determine how the application layer 902 can make use of the upper transport layer 922 with respect to data format, data encryption/decryption, and data verification. The upper transport layer 922 may process encryption/decryption and authentication of the application data passing to/from the access layer 920. The lower transport layer 924 may perform segmentation and reassembly of longer protocol data units (PDUs). The network layer 926 may perform network management tasks such as defining message address types and the network message formats. The network layer 926 may also handle authentication and/or encryption of network messages. Additionally, network layer 926 may handle the addressing aspect of the network messages (e.g., unicast, broadcast, or grouping).

The BLE layer 914 provides the Bluetooth low energy (LE) stack for generating or receiving Bluetooth radio waves. The proxy layer 912 is an intermediate layer that helps the BLE 914 to interact with the network layer 926, the mesh security layer 906, and the provisioning subsystem 910.

Figure 10:
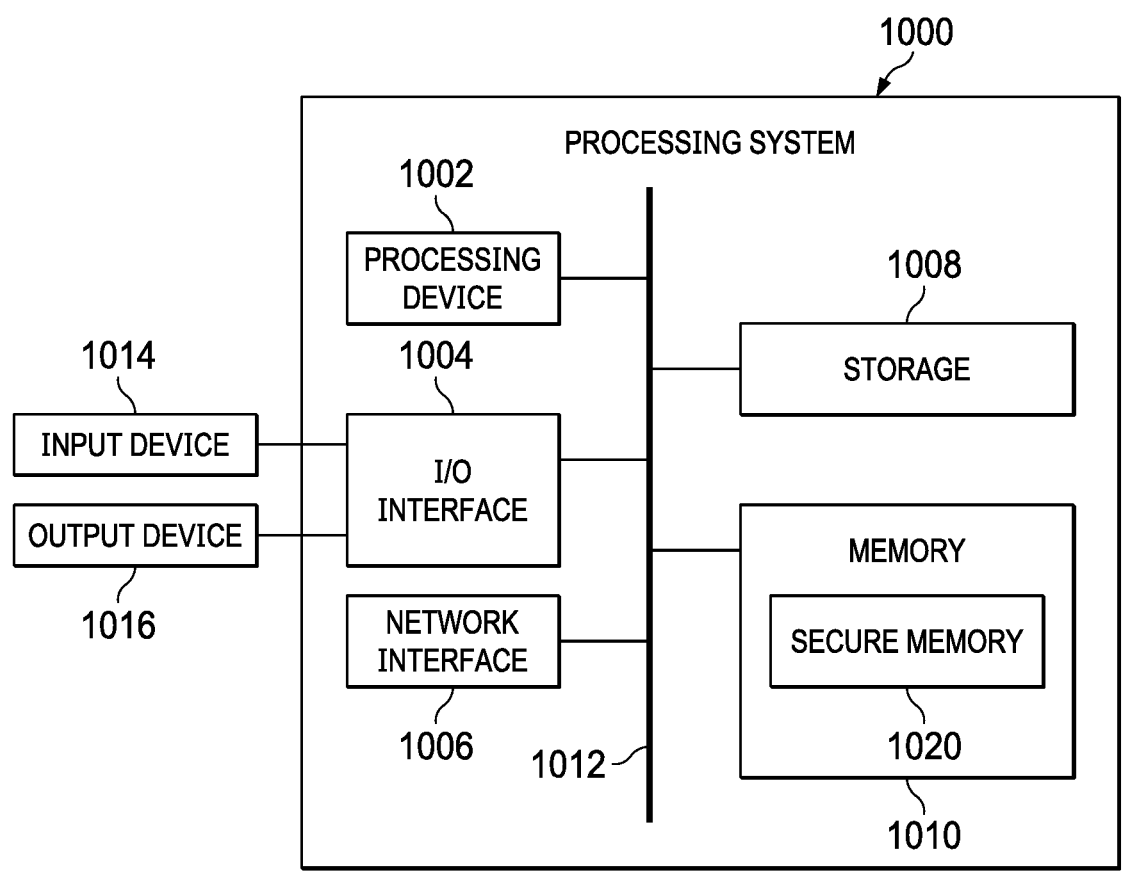
FIG. 10 illustrates a block diagram of an example processing system, according to some embodiments.

FIG. 10 is a block diagram of an example processing system 1000, which may be used to implement embodiments disclosed herein, and provides a higher level implementation example. The provisioning device as described above may be implemented using the example processing system 1000, or variations of the processing system 1000. The processing system 1000 could be a smart phone, a server, a desktop terminal, for example, or any suitable processing system. Other processing systems suitable for implementing embodiments described in the present disclosure may be used, which may include components different from those discussed below. Although FIG. 1000 shows a single instance of each component, there may be multiple instances of each component in the processing system 1000.

The processing system 1000 may include one or more processors 1002, such as a processor, graphics processing unit (GPU), a microprocessor, an application-specific integrated circuit (ASIC), a field-programmable gate array (FPGA), a dedicated logic circuitry, a tensor processing units (TPU), an artificial intelligence (AI) accelerator, or combinations thereof. The processing system 1000 may also include one or more input/output (I/O) interfaces 1004, which may enable interfacing with one or more appropriate input devices 1014 and/or output devices 1016. The processing system 1000 may include one or more network interfaces 1006 for wired or wireless communication with a network (e.g., an intranet, the Internet, a P2P network, a WAN and/or a LAN) or other node. The network interfaces 1006 may include wired links (e.g., Ethernet cable) and/or wireless links (e.g., one or more antennas) for intra-network and/or inter-network communications. At least one interface of the network interfaces 1006 is used to communicate data over a Bluetooth mesh network.

The processing system 1000 may also include one or more storage units 1008, which may include a mass storage unit such as a solid state drive, a hard disk drive, a magnetic disk drive and/or an optical disk drive. The processing system 1000 may include one or more memories 1010, which may include a volatile or non-volatile memory (e.g., a flash memory, a random access memory (RAM), and/or a read-only memory (ROM)). The non-transitory memory(ies) 1010 may store instructions for execution by the one or more processors 1002, such as to carry out examples described in the present disclosure, for example to perform recovery of security credentials of the Bluetooth mesh network. The one or more memories 1010 may include other software instructions, such as for implementing an operating system and other applications/functions. Optionally, the one or more memories 1010 may include a secure memory 1020 accessible only by a trusted execution environment of processing system 1000. The trusted execution environment may include secure memory 1020 storing certain secure data (e.g., the vendor specific key K described above). Trusted applications may also be stored in secure memory 1020 for accessing the secure data in secure memory 1020. In some examples, one or more data sets and/or modules may be provided by an external memory (e.g., an external drive in wired or wireless communication with the processing system 1000) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. There may be a bus 1012 providing communication among components of the processing system 1000, including the one or more processors 1002, I/O interface(s) 1004, network interface(s) 1006, storage unit(s) 1008, and the one or more memories 1010. The bus 1012 may be any suitable bus architecture including, for example, a memory bus, a peripheral bus or a video bus.

In FIG. 10, the input device(s) 1014 (e.g., a keyboard, a mouse, a microphone, a touchscreen, and/or a keypad) and output device(s) 1016 (e.g., a display, a speaker and/or a printer) are shown as external to the processing system 1000. In other examples, one or more of the input device(s) 1014 and/or the output device(s) 1016 may be included as a component of the processing system 1000. In other examples, there may not be any input device(s) 1014 and output device(s) 1016, in which case the I/O interface(s) 1004 may not be needed.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   retrieving, by a computing device in a Bluetooth mesh network, user login information;
   generating, by the computing device, a network key of the Bluetooth mesh network based on the user login information, the generating the network key of the Bluetooth mesh network comprising:
   applying, by the computing device, at least one cryptographic function to the user login information to generate the network key of the Bluetooth mesh network; and
   generating, by the computing device, an application key of a first node to be provisioned based on the user login information, wherein the network key and the application key are recoverable without storing the network key and the application key in a networked storage device.

2. The method of claim 1, wherein the user login information is one of a user pin, or a combination of a username and a password.

3. The method of claim 1, further comprising:
transmitting, by the computing device to the first node in the Bluetooth mesh network, a message comprising a provisioning command over the Bluetooth mesh network, the message encrypted based on the network key and the application key.

4. The method of claim 3, further comprising:
receiving, by the computing device, a number of nodes in the Bluetooth mesh network; and
generating, by the computing device, unicast addresses corresponding to the nodes sequentially based on the number of nodes.

5. The method of claim 4, further comprising:
generating, by the computing device, a device key for the first node of the nodes based on a unicast address corresponding to the first node, the message encrypted based on the network key, the application key, and the device key.

6. The method of claim 3, further comprising:
receiving, by the computing device, a beacon message from the first node over the Bluetooth mesh network, wherein the message further comprises an initialization vector (IV) index in the beacon message.

7. The method of claim 3, wherein the message further comprises a sequence number, and the method further comprises:
transmitting, by the computing device to the first node, messages with incrementing sequence numbers for each of the messages; and
determining, by the computing device, the sequence number in the message based on an acknowledge message received from the first node.

8. The method of claim 3, wherein the message further comprises a sequence number, and the method further comprises:
determining, by the computing device, the sequence number in the message to be zero (0) after receiving an update message for an IV index from the first node.

9. The method of claim 3, wherein the message further comprises a sequence number, and the method further comprises:
determining, by the computing device, the sequence number in the message based on an average number of messages per day transmitted to the first node.

10. The method of claim 3, wherein the message further comprises a sequence number, and the method further comprises:
determining, by the computing device, the sequence number in the message to be zero (0) after assigning a random number as a new address of the computing device, the random number being different from a previous address of the computing device.

11. A non-transitory computer-readable medium having instructions stored thereon that, when executed by a computing device in a Bluetooth mesh network, cause the computing device to perform operations, the operations comprising:
retrieving user login information;
generating a network key of the Bluetooth mesh network based on the user login information, the generating the network key of the Bluetooth mesh network comprising:
applying at least one cryptographic function to the user login information to generate the network key of the Bluetooth mesh network; and
generating an application key of a first node to be provisioned based on the user login information, wherein the network key and the application key are recoverable without storing the network key and the application key in a networked storage device.

12. The non-transitory computer-readable medium of claim 11, wherein the user login information is one of a user pin, or a combination of a username and a password.

13. The non-transitory computer-readable medium of claim 11, the operations further comprising:
transmitting, to the first node in the Bluetooth mesh network, a message comprising a provisioning command over the Bluetooth mesh network, the message encrypted based on the network key and the application key.

14. The non-transitory computer-readable medium of claim 13, the operations further comprising:
receiving a number of nodes in the Bluetooth mesh network; and
generating unicast addresses corresponding to the nodes sequentially based on the number of nodes.

15. The non-transitory computer-readable medium of claim 14, the operations further comprising:
generating a device key for the first node of the nodes based on a unicast address corresponding to the first node, the message encrypted based on the network key, the application key, and the device key.

16. The non-transitory computer-readable medium of claim 13, the operations further comprising:
receiving a beacon message from the first node, wherein the message further comprises an initialization vector (IV) index in the beacon message.

17. The non-transitory computer-readable medium of claim 13, wherein the message further comprises a sequence number, and the operations further comprise:
transmitting, to the first node, messages with incrementing sequence numbers for each of the messages; and
determining the sequence number in the message based on an acknowledge message received from the first node.

18. The non-transitory computer-readable medium of claim 13, wherein the message further comprises a sequence number, and the operations further comprise:
determining the sequence number in the message to be zero (0) after receiving an update message for an IV index from the first node.

19. The non-transitory computer-readable medium of claim 13, wherein the message further comprises a sequence number, and the operations further comprise:
determining the sequence number in the message based on an average number of messages per day transmitted to the first node.

20. The non-transitory computer-readable medium of claim 13, wherein the message further comprises a sequence number, and the operations further comprise:
determining the sequence number in the message to be zero (0) after assigning a random number as a new address of the computing device, the random number being different from a previous address of the computing device.

21. An apparatus in a Bluetooth mesh network, the apparatus comprising:
a memory;
one or more processors coupled to the memory, the one or more processors configured to:
retrieve user login information;
generate a network key of the Bluetooth mesh network based on the user login information, the one or more processors configured to generate the network key of the Bluetooth mesh network by:
   applying at least one cryptographic function to the user login information to generate the network key of the Bluetooth mesh network; and
generate an application key of a first node to be provisioned based on the user login information, wherein the network key and the application key are recoverable without storing the network key and the application key in a networked storage device.

22. The apparatus of claim 21, wherein the user login information is one of a user pin, or a combination of a username and a password.

23. The apparatus of claim 21, the one or more processors further configured to:
   transmit, to the first node in the Bluetooth mesh network, a message comprising a provisioning command over the Bluetooth mesh network, the message encrypted based on the network key and the application key.

24. The apparatus of claim 23, the one or more processors further configured to:
   receive a number of nodes in the Bluetooth mesh network; and
   generate unicast addresses corresponding to the nodes sequentially based on the number of nodes.

25. The apparatus of claim 24, the one or more processors further configured to:
   generate a device key for the first node of the nodes based on a unicast address corresponding to the first node, the message encrypted based on the network key, the application key, and the device key.

26. The apparatus of claim 23, the one or more processors further configured to:
   receive a beacon message from the first node, wherein the message further comprises an initialization vector (IV) index in the beacon message.

* * * * *